United States Patent [19]

Roy et al.

[11] 4,382,757
[45] May 10, 1983

[54] MOLDING APPARATUS FOR EXPANDING BEADS OF POLYSTYRENE MATERIAL

[75] Inventors: Richard Roy, Waterloo; Clerval Labbe; Albert Korman, both of Mansonville, all of Canada

[73] Assignee: Mansonville Plastics Limited, Quebec, Canada

[21] Appl. No.: 249,954

[22] Filed: Apr. 1, 1981

[51] Int. Cl.³ .............................................. B29D 27/00
[52] U.S. Cl. ........................... 425/4 R; 249/79; 264/51; 264/334; 264/DIG. 10; 425/441; 425/443; 425/444
[58] Field of Search .................. 249/79; 264/51, 53, 264/45.5, 334, DIG. 10; 425/DIG. 115, 4 R, 441, 443, 444

[56] References Cited

U.S. PATENT DOCUMENTS

| | | | |
|---|---|---|---|
| 852,892 | 5/1907 | McCall . | |
| 2,219,864 | 10/1940 | Dostal | 249/79 |
| 3,042,973 | 7/1962 | Brockaubs et al. | 264/51 |
| 3,086,248 | 4/1963 | Culp | 264/53 |
| 3,225,126 | 12/1965 | Bridges et al. | 264/51 |
| 3,235,908 | 2/1966 | Thompson | 264/51 X |
| 3,239,880 | 3/1966 | Oxel | 264/51 X |
| 3,295,172 | 1/1967 | Dain | 249/79 X |
| 3,377,653 | 4/1968 | Buonaiuto | 425/444 X |
| 3,537,131 | 11/1970 | Kracht et al. | 264/53 |
| 3,802,815 | 4/1974 | Buchmann . | |
| 3,811,646 | 5/1974 | Beasley . | |
| 3,888,647 | 6/1975 | Breeden et al. | 249/79 X |
| 4,106,884 | 8/1978 | Jegelka | 425/444 X |

Primary Examiner—Philip E. Anderson
Attorney, Agent, or Firm—Schwartz, Jeffery, Schwaab, Mack, Blumenthal & Koch

[57] ABSTRACT

An improved molding apparatus for expanding beads of polystyrene material into large blocks in the manufacture of insulating material. The mold apparatus has walls made from a plurality of tubular wall members arranged in horizontal, side-by-side relation. The wall members are mounted transversally within encircling frames. Steam is supplied to each wall member, and from within each wall member, into the mold cavity to expand the polystyrene beads held therein into a block. An improved device is also provided to remove the block from the mold cavity.

12 Claims, 10 Drawing Figures

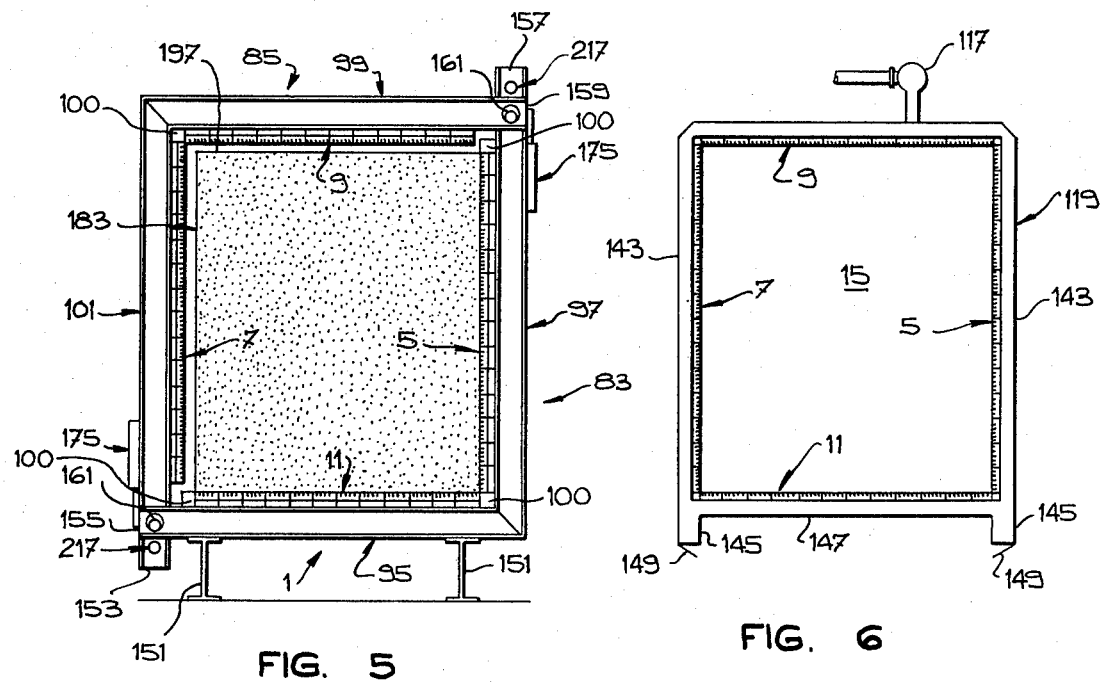
FIG. 5
FIG. 6
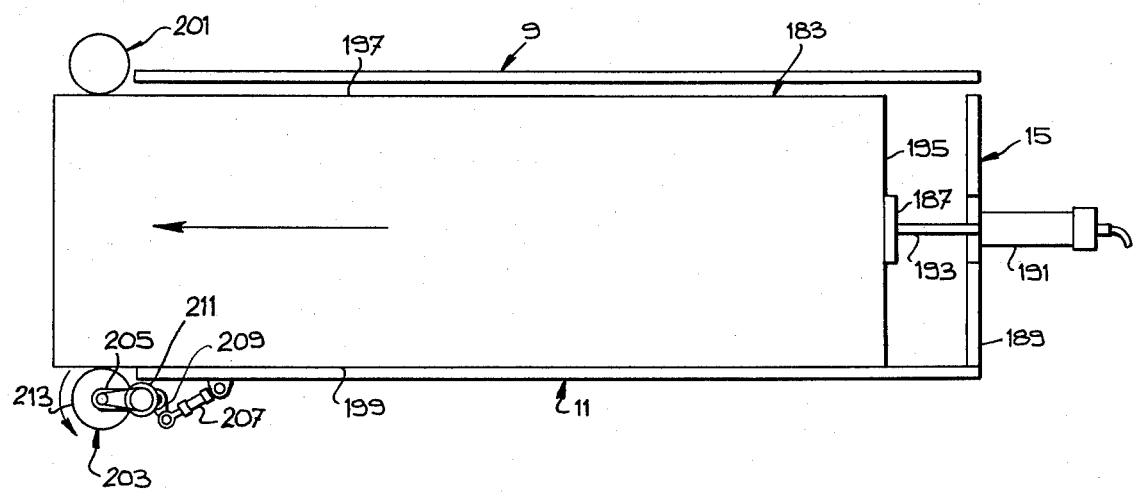
FIG. 7

MOLDING APPARATUS FOR EXPANDING BEADS OF POLYSTYRENE MATERIAL

The present invention relates to an improved molding apparatus.

The invention more particularly relates to an improved molding apparatus for use in molding large blocks of expanded thermoplastic material.

It is known to mold large blocks of expanded thermoplastic material for the purpose of producing sheets of insulating material. The molding material usually comprises beads of polystyrene. A mold is substantially filled with the beads of polystyrene and steam is then introduced into the mold through the mold walls to heat the beads, causing them to expand and coalesce into a large solid block of material. The block of material is then removed from the mold and sliced up into sheets of insulating material.

To allow the introduction of steam, the walls of the mold are hollow and plurality of openings are uniformly distributed over the inner face of each wall to connect the interior of the wall with the mold cavity. Steam is directed to the interior of the wall, and from within the wall, through the openings into the cavity. The construction is designed to try to uniformly distribute the steam through the material in the mold. In practice however uniform results are not always obtained. The steam in the vertical walls of the molds is usually hotter at the top of the walls than at the bottom. This temperature differential is magnified as a result of condensate collecting in the bottom of the walls and further cooling the steam in the lower part of the wall. In addition, the condensate often enters into the bottom of the mold cavity through the steam openings. The condensate in the bottom of the mold cavity adversely effects the expansion of the beads in this area. The beads in this bottom area do not always fully expand and thus the bottom portion of the block, particularly the lower corner portions must be discarded. Similarly, due to the temperature differential, the lower portion of the block often has an inferior quality from the upper portion, even if the condensate problem can be avoided. It is seen that with known molds, there can be a lot of waste.

The known molds are quite large with blocks up to forty or fifty feet in length, but limited in thickness to 24" to 26', the existing methods of holding do not permit thicker block molding. Single unit hollow walls of this size are often expensive to construct and difficult to handle. In addition, replacement of any wall unit is expansive.

It is an object of the present invention to provide a molding apparatus which minimizes the above disadvantages. It is more particularly an object of the present invention to provide an improved mold in a molding apparatus which distributes steam into the mold in a manner whereby more uniform temperatures are obtained throughout the mold.

It is another object of the present invention provide a mold which reduces the condensate problem, and thus minimizes waste of the molded article.

It is an object of the present invention to provide a molding apparatus which can hold thicker block up to 35" thus increasing productivity and minimizing waste of the molded article.

It is a further object of the present invention to provide a mold which can be more inexpensively constructed from a plurality or identical inexpensive members.

It is yet another object of the present invention to provide improved means for use in removing the molded block from the mold.

It is an additional object of the present invention to provide improvements in the manner in which the molding material is handled.

In accordance with the present invention, these objects are achieved with an improved mold, the walls of which are made from a plurality of identical tubular wall members. The tubular wall members can be easily and inexpensively extruded and cut to length as required. The wall members are arranged in side-by-side horizontal relation in each side wall of the mold. Steam is supplied to each wall member and from each wall member, through openings in its inner wall, into the mold cavity. Since each wall member is relatively short in height compared to the height of the wall in which it is assembled, the steam in each member does not experience as great a differential in temperature between its top and bottom areas as would occur in a single chamber wall. Thus the steam temperature within the mold is more uniformly maintained.

Each tubular wall member is advantageously constructed to prevent any condensate collected therein from entering the mold cavity. Instead, means are provided to collect the condensate outside of the mold cavity and to easily dispose of it.

In accordance with the present invention, novel means may also be provided for mounting the tubular members horizontally side-by-side to form side walls for a mold. The mounting means comprise spaced-apart frames encircling the mold, transverse to the tubular members mounted thereon. Each frame preferably comprises two frame members, each frame member comprising two arms extending at right angles to each other. The ends of the arms of one member is joined to the ends of the arms of the associated member. One set of frame members supports the tubular wall members forming the bottom and one side wall. The other set of frame members supports the tubular wall members forming the top and other side wall.

In accordance with the present invention, means may further be provided for moving the top and other side walls up and away from the bottom and one side walls to facilitate removal of the molded block from the mold. To this end means are provided for moving one set of frame members relative to the other set.

When the walls have been moved away from each other to facilitate removal of the block from the mold, other means are used for moving the block out of the mold. These means include pusher means to initially push the block from the back part way out of the mold through a front opening. Additional moving means are provided adjacent the front opening for drawing the block completely out of the mold.

The invention is particularly directed toward a molding apparatus having walls for use in forming a mold to define a mold cavity. At least some of the walls each consist of a plurality of elongated, tubular wall members, each wall member having an inner wall. The wall members are arranged horizontally, side by side with the inner walls aligned. Means are provided for supplying steam to each tubular wall member. Means are also provided along the length of each inner wall for distributing the steam from within the member into the molding cavity.

The invention is also directed toward a molding apparatus having walls for a mold to define a mold cavity, one wall being movable to provide an access opening to the mold cavity. Means are provided in the opposite wall of the mold for pushing an article part way out of the mold, through the access opening. Means are also provided on the mold adjacent the opening for moving the article completely out of the mold.

The invention will be better understood with reference to the following description of a preferred embodiment thereof, taken in connection with the accompanying drawings in which:

FIG. 5 is a cross-sectional view of the mold showing the mold walls separated;

FIG. 6 is a cross-sectional view of the mold showing detail of a steam distribution duct;

FIG. 7 is a cross-sectional schematic view of the mold showing the means for moving a molded block out of the mold;

Figure 1:
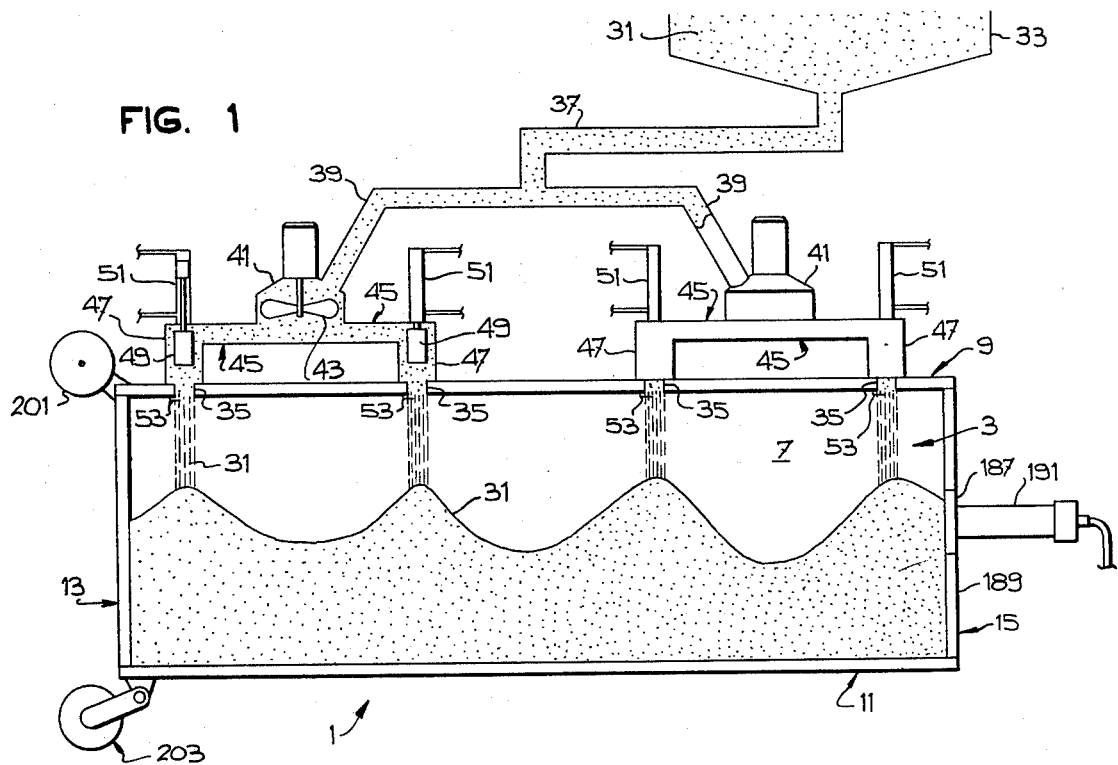
FIG. 1 is a schematic side elevation view of a mold apparatus, in partial section.
Figure 3:
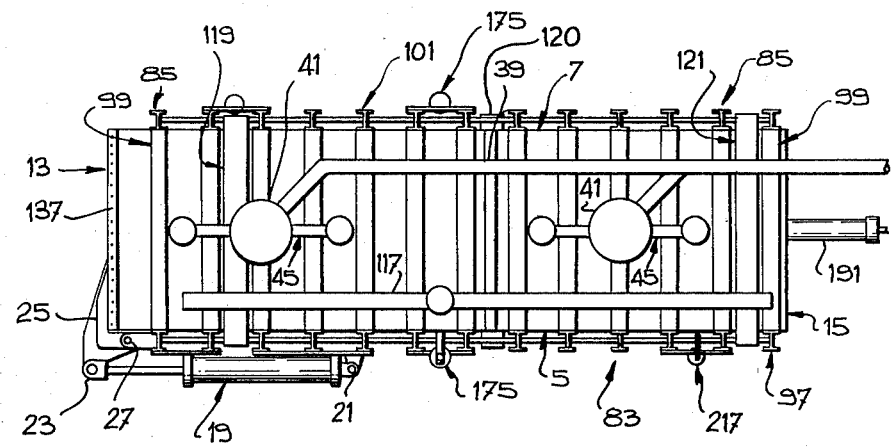
FIG. 3 is a top view of the mold apparatus.

The molding apparatus shown in FIGS. 1 and 3, has walls forming a mold 1. The mold 1 defines a mold cavity 3 within which particles of polystyrene, or other suitable material, are molded to form a solid block. The mold cavity 3 has a square or rectangular cross-sectional shape and is defined by side walls 5, 7, 9 and 11 and end walls 13 and 15.

One of the end walls 13 is hinged along one side to the side wall 5, as shown in FIG. 3, by pivot means to provide a door for opening the mold cavity 3. A hydraulic or pneumatic cylinder device 19 is positioned along the side wall 5 of the mold adjacent the end wall 13. The cylinder device 19 which is preferably pneumatic, is pivotably fastened at one end 21 to the side wall 5 and is pivotally fastened at its other end 23 to a bracket 25 fixed to the end wall 13. The bracket 25 is also hinged to the side wall 5 by pivot means 27. Operation of the cylinder device 19 opens the end wall 13 about the pivot means 27 to provide access to the mold cavity 3.

Means are provided for filling up the mold cavity 3 with particles of molding material such as polystyrene beads 31. The polystyrene beads 31 are stored in a bin 33 above the mold 1 as shown in FIG. 1. Inlets 35 are provided in the top side wall 9 of the mold 1 for feeding the polystyrene beads from the bin 33 into the mold cavity 3. Four such inlets 35, equally spaced-apart along the length of the top wall, and on its center line, are shown. A main duct 37 leads from the bottom of the bin 33 and divides into two branch ducts 39. Each branch duct 39 leads to a blower chamber 41, one located near each end of the mold 1. A fan 43 is provided in each blower chamber 41 to draw material from the bin and blow it into the cavity 3. A pair of feed ducts 45 lead from each blower chamber 41, one duct 45 leading to each inlet 35 in the top side wall 9. Each feed duct 45 has a vertical run 47 just above the inlet 35. A closure member 49 is movably located in the vertical run 47 of each feed duct 45. The closure member 49 is operated by a hydraulic cylinder device 51 to move vertically in the vertical run 47 of the feed duct 45 to open or close the inlet 35.

A pressure switch 53 can be located in the ducts 45 leading from each blower chamber 41 to the inlets 35. The pressure switch 53 is located in such a position so as to be actuated by the build-up of pressure within the feed ducts 45. When the material within the cavity reaches the top of the mold, the pressure builds up in the feed ducts 45 and the switch 53 automatically shuts off the fan 43 feeding material to that particular inlet. The inlets 35 are spaced apart along the length of the mold cavity 3 in a manner to generally uniformly fill the cavity with molding material. Thus, when the pressure switch 53 is actuated, the level of material in the mold cavity is close to the other inlet fed by the same fan.

Once the mold cavity 3 is substantially filled up with molding material, the inlets 35 are closed by closure members 49 and steam is fed into the mold cavity to heat the molding material to expand it within the cavity. The steam is provided under sufficient pressure to throughly penetrate the bead material filling the mold cavity.

Figure 8:
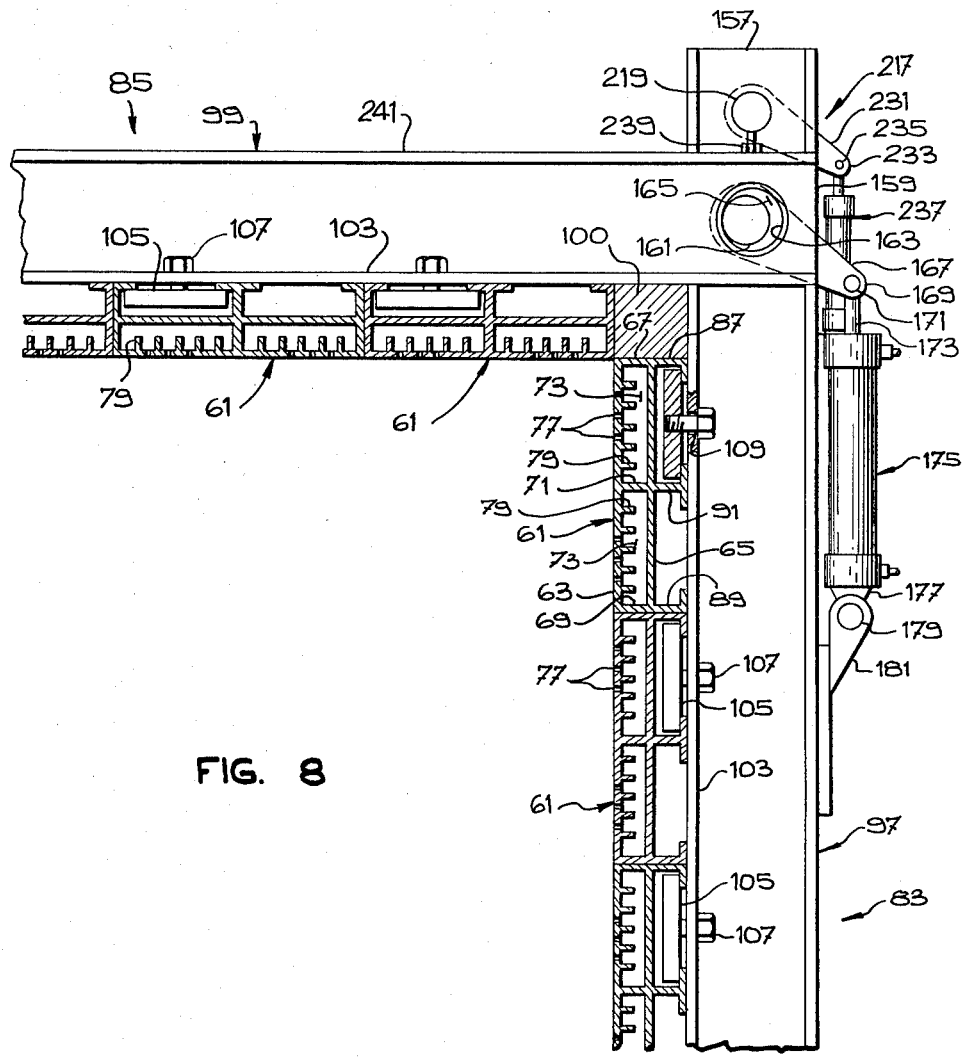
FIG. 8 is a detail cross-sectional view showing the mounting of the tubular wall members in detail.
Figure 10:
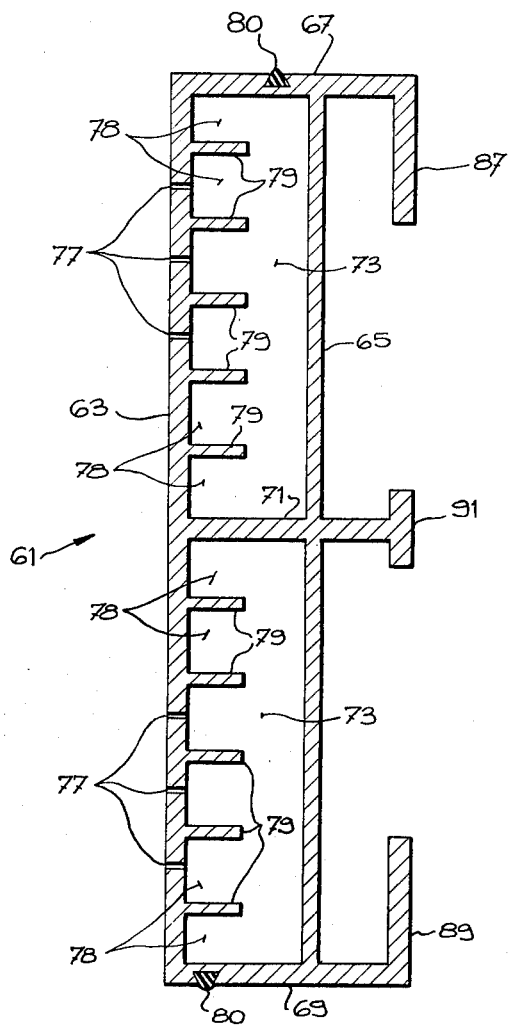
FIG. 10 is a detail cross-sectional view of the tubular wall members as such.

In accordance with the present invention, the apparatus is constructed to more uniformly distribute the steam through the molding material than is presently done in known molding apparatus. To this end, at least the side walls of the mold defining the cavity, and preferably, all the walls, are each constructed from a plurality of tubular wall members 61. In the side walls, the tubular wall members 61 are preferably arranged horizontally. Each tubular wall member 61 as shown in FIGS. 8 and 10 has an inner wall 63, an outer wall 65 and side walls 67 and 69 joining the inner and outer walls 63 and 65 together. An intermediate wall 71 is preferably provided midway between the side walls 67 and 69, which extends between the inner and outer walls 63 and 65 to divide the interior of the wall member into two identical chambers 73. Openings are provided in the inner wall 63 to communicate with each chamber 73. The openings comprise a row of longitudinally spaced-apart groups of slots 77 extending the length of the wall member in the central area of the inner wall portion enclosing each chamber 73. The slots 77 are preferably arranged in groups of three horizontal slots as clearly shown in FIG. 2. To improve the structure and efficiency of the mold, each tubular wall member 61 also comprises a plurality of fins 79 projecting inwardly into each chamber 73 from the inner wall 63. The presence of the fins 79 inside the chambers 73 is rather critical as they act simultaneously as stiffening ribs to strengthen the inner wall 63 of each chamber, and as internal baffles either to improve heat transfer between the steam circulating inside the chamber 73 and the inner wall 63 of the mold, to artificially create a plurality of independent sub-chambers 78 inside the chambers 73 in which any condensation water is trapped and to reduce turbulences inside the chambers 73, which may allow the condensation water to inadvertandly enter into the mold and spoil the material to be molded. As shown in FIG. 10, the number of slots 77 is preferably smaller than the number of sub-chambers 78 and each slot 77 is advantageously associated to, and communicates with, only one sub-chamber 78 to favor the above mentioned actions of the fins 79.

As can be easily understood, each tubular member 61 can be easily manufactured by extrusion with the slots 77 being cut into the wall after the member is formed, and the members being cut to length.

The tubular wall members 61 in each wall are joined together, by suitable means in side-by-side relationship with their adjacent side walls 67 and 69 abutting, and with the inner walls 63 aligned. To improve the sealing, of each wall each tubular wall members 61 may be provided with lateral seals 80 inserted and maintained in corresponding dove-tail recesses in both side walls 67 and 69, respectively. The tubular wall members 61 in the side walls of the mold are joined together by two sets of exterior frame members 83 and 85. For this purpose, each tubular wall member 61 has means projecting from its outer wall 65 for use in detachably connecting the wall member 61 to either of the frame members 83 and 85. These projecting means comprise L-shaped flanges 87 and 89 projecting outwardly from the outer wall 65 as extensions of the side walls 67 and 69 respectively, and a T-shaped flange 91 projecting outwardly from the outer wall 65 as an extension of intermediate wall 71. The L-shaped flanges 87 and 89 both are turned inwardly toward the T-shaped flange 91.

The first set of exterior frame members 83 comprises a set of longitudinally spaced apart L-shaped frame members having one arm 95 lying adjacent the bottom side wall 11 of the mold 1, and the other arm 97 lying adjacent one side wall 5 as shown in FIG. 5. The second set of exterior frame members 85 comprises a set of longitudinally spaced apart L-shaped frame members having one arm 99 lying adjacent the top side wall 9 of the mold, and the other arm 101 lying adjacent the other side wall 7. Each frame member 83 and 85 preferably comprises an I-beam and the tubular wall members 61 in each side wall lie against a flange 103 of the I-beam. Each tubular wall member 61 is fastened to a frame member 83 and 85 by means of one or more fastening plates 105 and bolts 107. The fastening plate 105 is sized to fit within the space defined between one of the L-shaped flanges 87 and 89 and the T-shaped flange 91. The bolts 107 pass through holes 109 in the flange 103 of the I-beam, frame members and into a threaded hole in the plate 105. When the bolts 107 are tightened, the plates 105 are drawn tightly toward the I-beams and, via the flanges 87 or 89 and 91 on the tubular wall members, tightly clamp the wall members 61 against the flanges 103. The frame members 83 and 85 are arranged opposite and adjacent each other. The free ends can be fixedly joined together to provide permanent encircling frame members spaced longitudinally of the mold. Preferably however, the frame members are movably joined together as will be described.

Figure 2:
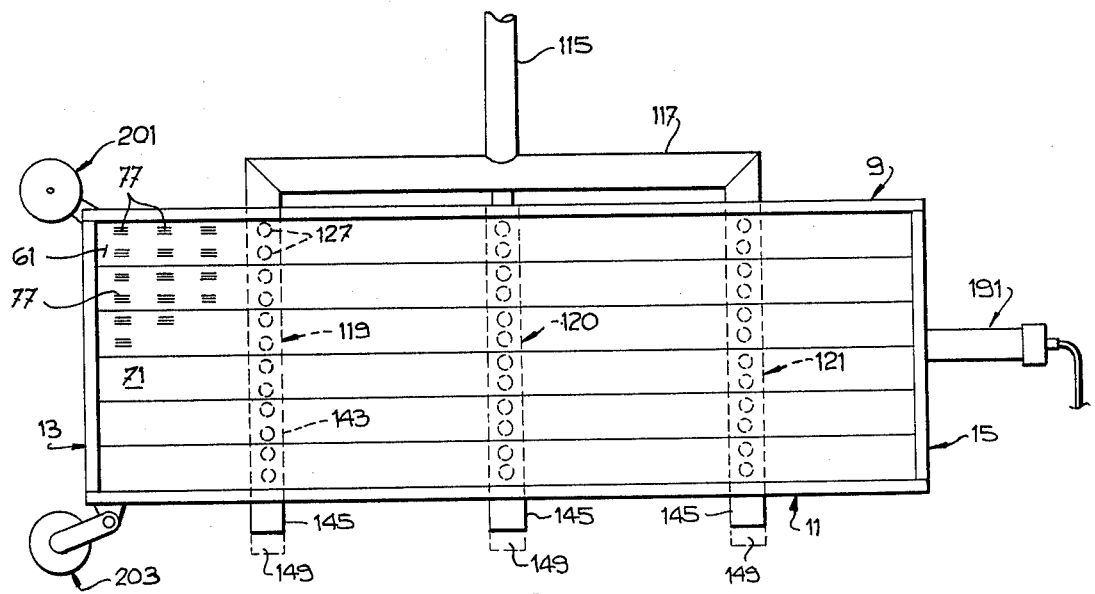
FIG. 2 is a schematic cross-sectional view of the mold showing the steam distribution means.

Means are provided for supplying steam to every chamber 73 in the tubular wall members 61. From the chambers 73 the steam is directed through the slots 77 into the mold cavity 3. The steam supply means as shown in FIGS. 2, 6 and 8 includes a main line 115 leading to the apparatus from a source of steam (not shown). The main line 115 leads to a longitudinal distribution duct 117 located above the top side wall 9. The longitudinal distribution duct 117 in turn leads to one partially encircling distribution duct 120 located midway the length of the top sidewall, and to two encircling distribution ducts 119 and 121 each located a distance equal to about one-quarter the length of the side wall, inwardly from the end walls 13 and 15 respectively. The distribution duct 120 extends along bottom and both side of the mold only while each distribution duct 119 or 121 completely encircles the mold 1 about its walls between the frame members 83 and 85 as shown in FIG. 1. To accommodate the ducts 119, 120 and 121, slots are formed in each wall by removing sections of the L-shaped and T-shaped flanges 87, 89 and 91. The ducts 119 and 121 fit snugly into the slots so formed, which slots are transverse to the flanges, with their inner wall 123 lying adjacent the outer walls 65 of the tubular wall members 61. An outlet opening 125 is provided in the inner wall 123 of each duct 119, 120 and 121, aligned with an opening 127 in the outer wall 65 of each wall member 61 leading to each chamber 73. The steam flows from the distributing ducts 119, 120 and 121 through the aligned openings 125 and 127 into each chamber 73. From each chamber 73 the steam passes into the mold cavity 3 through the slots 77.

Figure 4:
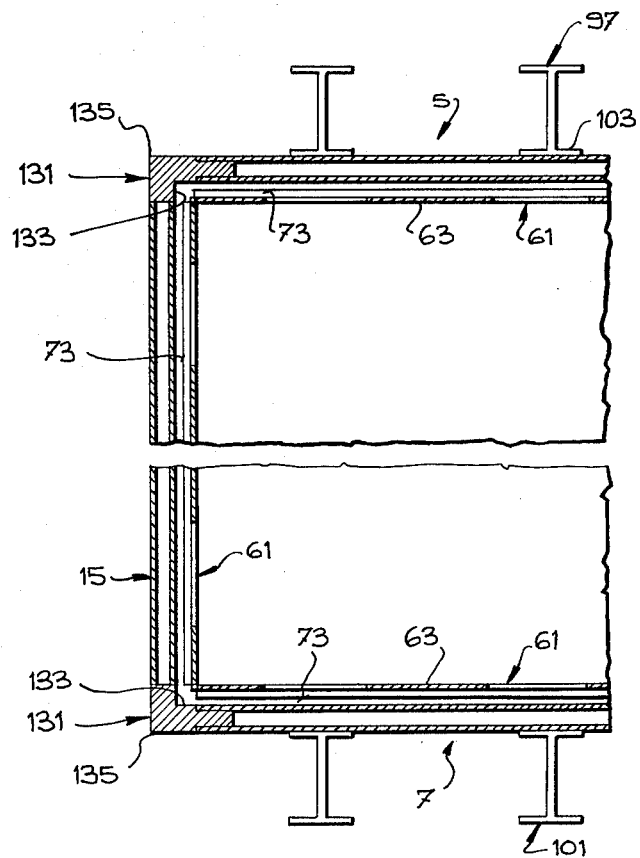
FIG. 4 is a cross-sectional detail view of the back end of the mold.

The back end wall 15 of the apparatus 1 can have its tubular wall member 61 arranged side-by-side and horizontally, the members aligned with the tubular wall members 61 in the side walls 5 and 7. Suitable frame members means (not shown) hold the end wall tubular members together. Corner post members 131 as shown in FIG. 4 are provided to connect the chambers 73 in the tubular wall members 61 in the side walls 5 and 7 with the chambers 73 in the tubular wall members 61 in the end wall 15. Each corner post member 131 has a cut-out 133 diagonally opposite its outer corner 135 to connect adjacent chambers 73 together. The corner posts 131 can be fastened with suitable means (not shown) to the side wall 5, 7.

The front end wall 13 can have its tubular wall members 61 arranged side-by-side vertically. Again, suitable frame means (not shown) hold the members 61 together. The front wall 13 fits between the top and bottom side walls 9 and 11. Holes 137 in the inner walls of the top and bottom side walls 9 and 11 as shown in FIG. 3, provide steam communication between the horizontal chambers in the top and bottom walls 9 and 11 and between the vertical chambers in the front wall 13.

The steam inlet openings 127 in the outer walls 65 of the tubular walls members 61 are sized to be greater in width than the width of the group of slots 77 opposed to them, the groups of slots 77 in each chamber 73 being centered with respect to the steam inlet opening 127. When any condensate builds up during steaming in the bottom of each chamber 73 in the side walls 5 and 7 and back end wall 15, it will drain out through the bottom edge 141 of steam openings 127 and 125 into the vertical run 143 of the encircling ducts 119 and 121 rather than draining through the bottom slot of the group of slots 77 into the mold cavity 3. Suitable means (not shown) can be provided for draining condensate from the chambers of the bottom wall 11. The condensate which is collected in each vertical run 143 of the encircling ducts 119, 121 can be collected in an extension 145 of the vertical run at its bottom end projecting below the bottom horizontal run 147 of the duct. A trap door 149 normally closes this extension 145. The door 149 can be periodically opened to allow the collected condensate to drain away.

As can be easily understood, the above arrangement of the steam inlet openings is of a great interest as it completes the action of the fins 79 as described hereinabove.

The side walls defining the mold cavity are designed to move slightly away from each other to facilitate removal of the block of material formed in the cavity.

To this end, means are provided for moving one side wall 7 and the top side wall 9 up and away from the other side wall 5 and the bottom side wall 11. These moving means preferably include excentric mountings for mounting one set of frame members 83 relative to the other set of frame members 85. In more detail the one set of frame members 83 is fixedly mounted to a fixed mounting frame 151 via its horizontal bottom arms 95. The bottom ends 153 of the vertical arms 101 of the movable frame members 85 overlap and project past the ends 155 of the horizontal arms 95 of the fixed members 85 as shown in FIG. 5. Similarly the top ends 157 of the vertical arms 97 of the fixed frame members 83 overlap and project past the ends 159 of the horizontal arms 99 of the movable frame members 85. The overlapped ends 155, 153 of arms 95 and 101, and the overlapped ends 157, 59 of arms 97, 99 are both joined together in the same manner. Only one such connection will therefore by described.

Having reference to FIG. 8, a moving shaft 161 extends longitudinally of the side walls 5, 9 through the sets of overlapped arms 97 and 99 of the frame members 83, 85. In each fixed arm 197, the shaft 155 passes snuggly through a hole (not shown) just slightly larger than the shaft 161 allowing the shaft to freely rotate in the fixed frame arms 97. In each movable frame arm 99, the shaft 161 passes through an enlarged circular hole 163 eccentric to the shaft. A circular disk 165 is eccentrically mounted on the shaft 161, snugly fitting within circular hole 163. A crank arm 167 is fixed to the shaft 161, intermediate its ends and between adjacent frame members 83. The crank arm 167 has a free end 169 which is pivotally connected by a pin 171 to one end 173 of a hydraulic or pneumatic cylinder device 175. The other end 177 of the hydraulic or pneumatic cylinder device 175 is connected by a pivot pin 179 to a bracket 181 fixed to one or more of the frame members 83. The eccentric hole end disc arrangement at the diagonally opposite corners of the mold cavity 3 are so arranged that when the cylinder device 175 at each corner is actuated, the rotation of the cranks 167 will rotate the shafts 161 in a manner to move the movable frame members 85 up and away from the fixed frames 83. This results in side wall 7 and 9 moving up and away from the side walls 5 and 11 and in separating from the molded block 183 formed in the mold cavity 3 as shown in FIG. 5. Once the block 183 is removed, reverse operation of hydraulic or pneumatic cylinder devices 175 will return the side walls 7, 9 back to their normal position where they abut the side walls 11 and 5.

Figure 9:
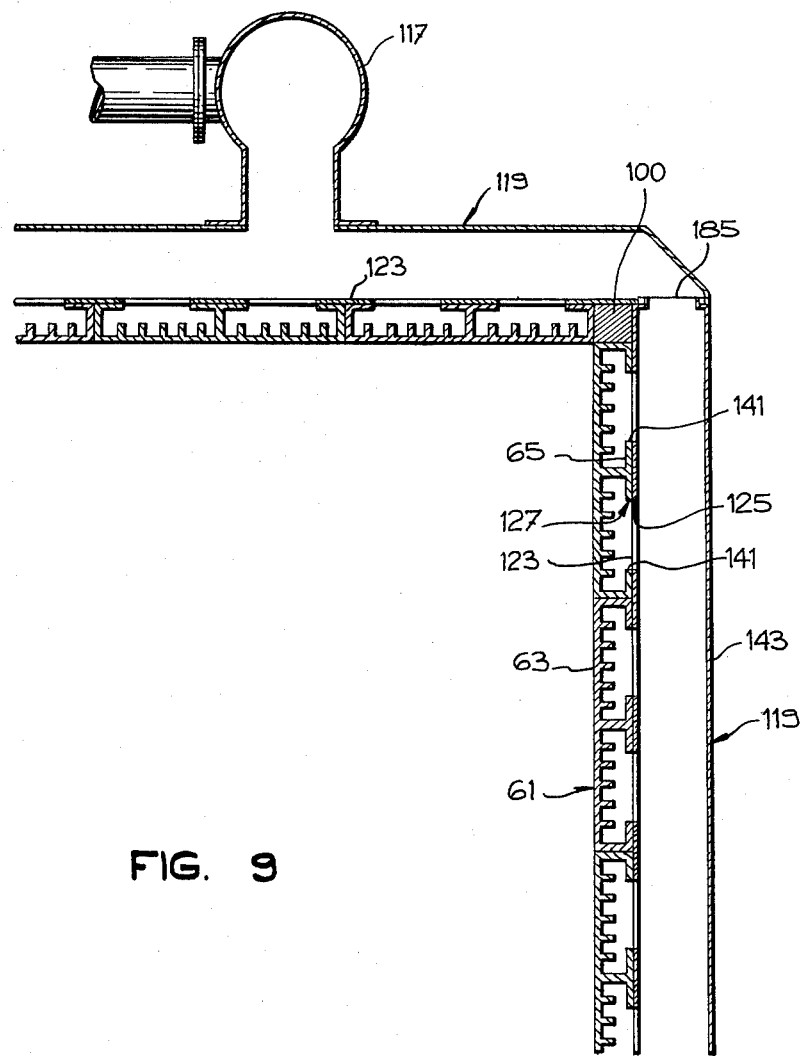
FIG. 9 is a detail cross-sectional view showing the relation of the steam duct to the tubular wall members.

To facilitate separation of the walls 7 and 9 from walls 11 and 5, each steam encircling duct 119, 120 and 121 can be made in two-L-shaped parts, the parts adapted to abut at their ends to form a seal 185 at each abutment as shown in FIG. 9. In addition, the material feed duct 37 can be flexible.

To improve sealing between the sidewalls 7 and 9 and the bottom and top walls 9 and 5 respectively, use can be made of rectangular seals 100 at each corner of the mold as shown in FIGS. 5, 8 and 9. The seals 100 advantageously cooperate with the lateral seals 80 of the tubular wall members 61 to make the mold prefectly tight even under high internal pressure.

When the side walls 7 and 9 of mold 1 have been moved away from side walls 11 and 5, suitable means are provided to move the molded block 183 out of the mold cavity 3. These pusher means can comprise providing a central section 187 in the back end wall 15 which is movable into and out of the plane of the fixed wall section 189, as shown in FIG. 7. A hydraulic or pneumatic device 191 is fixedly mounted on the fixed wall section 189 by suitable means and has its movable piston rod 193 fixed to the movable wall section 187. Operation of the hydraulic device 191 will move the wall section 187 into the mold cavity 3 pushing against the back wall 195 of block 183 to push it partly out of the mold cavity 3.

The block 183 is pushed far enough to be gripped at its top and bottom surfaces 197 and 199 by two withdrawing rollers 201 and 203 respectively. The top roller 201 is freely rotatable and is mounted by suitable means (not shown), to the horizontal arm 99 of first movable frame 85 adjacent the front end of the mold 9. Means can be provided to vary the height and pressure of the top roller 201, if desired, to have it bear on the top surface 197 of the block 183 for guiding it out. The bottom roller 203 is rotatably mounted between the ends of a pair of arms 205 as shown in FIG. 7. The arms 205 are pivotally mounted intermediate their ends to bracket fixed to the bottom arm 95 of the first fixed member 83 adjacent the front end of the mold 1. The other ends of the arms 205 are connected to one end of a hydraulic or pneumatic cylinder device 207 via a crank arm 209. The hydraulic or pneumatic device 207 is fixed at its other end to the fixed frame members 83. Motor means 211 are provided for rotating the bottom roller 201. The outer surface 213 of the bottom roller 201 is ribbed or roughened to provide good contact with the bottom surface 199 of the block 183.

The bottom roller 203 is normally stored below the bottom wall 11 as shown in FIG. 2. Once the block 183 has been moved part way out of the mold cavity 3, the hydraulic or pneumatic device 207 is actuated to move the roller 201 up into contact with the block 183 and to grip it tightly between top roller 201. Operation of the motor 211 will rotate the bottom roller 203 in a direction to pull the block 183 completely out of the mold cavity 3. The removed block 183 may then by sliced by suitable means into sheets of insulating material.

If desired, locking means 217 can be provided to prevent movement of the movable frame members 85 away from the fixed frame members 83 during the period when the material is expanded in the mold cavity. Considerable pressure is exerted on the side walls during expansion and if locking means were not provided, the walls might move apart. The locking means 217, as shown in FIG. 5, can be provided at the diagonally opposite corners of the mold 1 where the movable and fixed frame members 83 and 85 meet. They can include, at each corner, a locking shaft 219 extending the length of the mold 1 through aligned holes in the portions 153 and 157 of the frame arms 97 and 101 which project past the overlapping the frame arms 99, and 95 respectively. Each locking shaft 219 is parallel to the adjacent moving shaft 161. As shown more clearly in FIG. 8, the locking shaft 219 is rotatably mounted in arms 97 (and arms 101) and a crank arm 231 is fixed to the locking shaft 219. The crank arm 231 is pivotally connected at its free end 233 by a pivot pin 235 to one end of a hydraulic cylinder device 237. The other end of the hydraulic cylinder device 237 is pivotally connected to the vertical arm 97 of one the fixed fram members 83. Stop members 239 are fixed to the shaft 219 and normally project downwardly therefrom to abut on the outside flange 241 of the overlapping arm 99 of the frame members 85. The stop members 239 lock the movable frame members 85 in place during forming. When the frame members 85 are to be moved away from the fixed frame members 83 by the moving shafts 161, the hydraulic device 237 is actuated to rotate locking shaft 219 via crank arm 231. Thus the stop members 239 are rotated away from the outer flange 241 of the frame members 85 allowing their movement.

We claim:

1. In an apparatus for molding large blocks of expanded thermoplastic material, said apparatus comprising:
   a plurality of walls that together form a mold defining a mold cavity, at least some of said walls being hollow and having interiors connected to the mold cavity by means of a plurality of openings,
   means for filling up said mold cavity with beads of material to be molded, and
   means for supplying steam to the interiors of said hollow walls and from within said hollow walls through the openings into the mold cavity, to heat said beads of material to be molded and cause them to expand and coalesce, wherein:
   each of said hollow walls comprises a plurality of elongated, tubular wall members each having inner and outer walls, said wall members being arranged side-by-side with their inner walls aligned to form together the mold defining the mold cavity,
   said means for supplying steam comprises means for distributing said steam into each of said tubular wall members,
   each of said wall members has a plurality of fins extending along, and projecting inwardly from its inner wall to stiffen said inner wall, to improve heat transfer and to create a plurality of independent sub-chambers in which any condensate may be trapped, said wall openings being located between some of said fins to distribute in turn the steam from within said member into the molding cavity,
   each of said wall members also has means projecting from its outer wall for transversely mounting it onto spaced apart frames which permanently encircle the mold,
   each of said frames comprises at least two frame members and means for movably connecting said frame members together so that said frame members may slightly move away from a molding position where the wall members mounted onto said frame members together form the mold, to a block removing position where part of said wall members separate from the molded block to facilitate its removal from the mold, and vice versa, and
   said means for filling up the molding cavity with beads of material to be molded comprises:
   duct means for directing said beads of material to be molded from a storage area to at least two spaced-apart inlets in one of the walls of said mold,
   blower means in the duct means for moving the beads from said storage area to the molding cavity, and
   means for closing each inlet after the mold cavity has been filled up with beads.

2. An improved molding apparatus as claimed in claim 1 wherein said means for filling up the molding cavity further comprises at least one pressure switch located in the duct means at the vicinity of at least one inlet to automatically shut off the blower means feeding the beads when the molding cavity is full.

3. An improved molding apparatus as claimed in claim 1 wherein said frames and tubular wall member are all made of the same material.

4. An improved molding apparatus as claimed in claim 1, wherein each frame member has a pair of arms extending at right angles to each other and one frame member of each frame is fixed.

5. An improved molding apparatus as claimed in claim 4 wherein the movably connecting means comprises:
   a pair of shafts extending the length of the mold, one shaft connecting the ends of one arm of one set of frame members to one arm of the other set of frame members, the other shaft connecting the ends of the other arm of the one set of frame members, each shaft being eccentrically mounted in the arms of the other set of frame members, and
   means for rotating each shaft to move the other set of frame members and the wall members attached thereto, away from the one set of frame members and their attached wall members.

6. An improved molding apparatus as claimed in claim 5 including separate locking means for selectively preventing movement of the one set of frame members relative to the other set of frame members.

7. An improved molding apparatus as claimed in claim 1 wherein the means projecting outwardly from each tubular wall member comprise at least two flanges, mounting plate means adapted to be held by the flanges, and fastening means connecting the plate means to the encircling frames with the flanges clapped between the plate means and the frames.

8. An improved molding apparatus as claimed in claim 1 wherein said means for distributing steam into each of said tubular wall members include vertical ducts adjacent the wall members, openings in the ducts and the wall members for conducting steam from the ducts to each wall member, said openings in each wall member being located below the steam distributing means in each wall member whereby condensate leaves each tubular wall member via its openings and is collected in the vertical steam ducts.

9. An improved molding apparatus as claimed in claim 8 including means at the bottom of each steam duct for collecting the condensate, and means at the bottom of each collecting means for draining the condensate therefrom.

10. An improved molding apparatus as claimed in claim 1 wherein said duct means has a vertical run to each inlet and said inlet closing means comprises closure means in each vertical run, and means to operate each closure means to close the associated inlet.

11. An improved molding apparatus as claimed in claim 1 further comprising:
   means for opening one of the walls of the mold to provide an access opening to the molding cavity,
   means in the opposite wall for initially moving the molded article part way out of the mold through the access opening, and
   means on the mold adjacent the opening for moving the article completely out of the mold.

12. An improved molding apparatus as claimed in claim 11 wherein the moving means on the mold adjacent the opening comprises a drive roller at the bottom of the opening, a guide roller at the top of the opening, means for moving the drive roller up toward the guide roller to grip the article between the rollers, and means for rotating the drive roller to draw the article out of the mold.

* * * * *